(12) United States Patent
Beaurepaire et al.

(10) Patent No.: US 11,187,545 B2
(45) Date of Patent: Nov. 30, 2021

(54) METHOD AND APPARATUS FOR GENERATING A POOLED ROUTE TO EXTEND A SERVICE AREA OF A SHARED VEHICLE

(71) Applicant: HERE GLOBAL B.V., Eindhoven (NL)

(72) Inventors: Jerome Beaurepaire, Berlin (DE); Uwa Okonkwo, Berlin (DE)

(73) Assignee: HERE Global B.V., Eindhoven (NL)

( * ) Notice: Subject to any disclaimer, the term of this patent is extended or adjusted under 35 U.S.C. 154(b) by 217 days.

(21) Appl. No.: 16/201,711

(22) Filed: Nov. 27, 2018

(65) Prior Publication Data

US 2020/0166353 A1 May 28, 2020

(51) Int. Cl.
G01C 21/34 (2006.01)
G01C 21/36 (2006.01)
G01C 21/20 (2006.01)

(52) U.S. Cl.
CPC ......... G01C 21/3438 (2013.01); G01C 21/20 (2013.01); G01C 21/3664 (2013.01)

(58) Field of Classification Search
CPC . G01C 21/3438; G01C 21/3664; G01C 21/20
USPC ........................................................ 701/425
See application file for complete search history.

(56) References Cited

U.S. PATENT DOCUMENTS

| | | | | |
|---|---|---|---|---|
| 8,880,273 | B1* | 11/2014 | Chatham | G08G 1/167 701/28 |
| 2014/0062790 | A1* | 3/2014 | Letz | H04L 51/20 342/386 |
| 2015/0348178 | A1* | 12/2015 | Taylor | G06Q 30/0645 705/307 |
| 2016/0320194 | A1* | 11/2016 | Liu | G01C 21/3423 |
| 2016/0321566 | A1 | 11/2016 | Liu et al. | |
| 2016/0321771 | A1* | 11/2016 | Liu | G01C 21/3438 |
| 2017/0169366 | A1* | 6/2017 | Klein | G06Q 50/30 |
| 2017/0344928 | A1* | 11/2017 | Shimura | G06Q 10/063114 |
| 2018/0060827 | A1* | 3/2018 | Abbas | G05D 1/0285 |
| 2018/0356238 | A1* | 12/2018 | Berlingerio | G01C 21/362 |
| 2019/0101401 | A1* | 4/2019 | Balva | G06Q 10/047 |
| 2019/0265052 | A1* | 8/2019 | Nishimura | G08G 1/202 |

(Continued)

OTHER PUBLICATIONS

Gavalas et al, "Design and Management of Vehicle Sharing Systems: a Survey of Algorithmic Approaches", Available online Jun. 17, 2016, pp. 1-38.

*Primary Examiner* — Jonathan M Dager
*Assistant Examiner* — Jean W Charleston
(74) *Attorney, Agent, or Firm* — Ditthavong, Steiner & Mlotkowski

(57) ABSTRACT

An approach is provided for generating a pooled route to extend a service area of a shared vehicle. The approach involves receiving a request from a first user to travel a first route to a destination outside of the service area of the shared vehicle. The approach also comprises determining a second user with a second route that uses the shared vehicle and that is within a threshold proximity, a threshold time, or a combination thereof of the first route, the destination, or a combination thereof. The approach further comprises computing the pooled route for the first user to travel to the destination using the shared vehicle and for the second user to return the shared vehicle to the service area after the first user reaches the destination.

17 Claims, 12 Drawing Sheets

(56) References Cited

U.S. PATENT DOCUMENTS

| 2020/0064143 A1* | 2/2020 | Engle | G01C 21/3415 |
| 2020/0118048 A1* | 4/2020 | Suzuki | G01C 21/3694 |
| 2020/0272955 A1* | 8/2020 | Shimodaira | G06Q 10/047 |

* cited by examiner

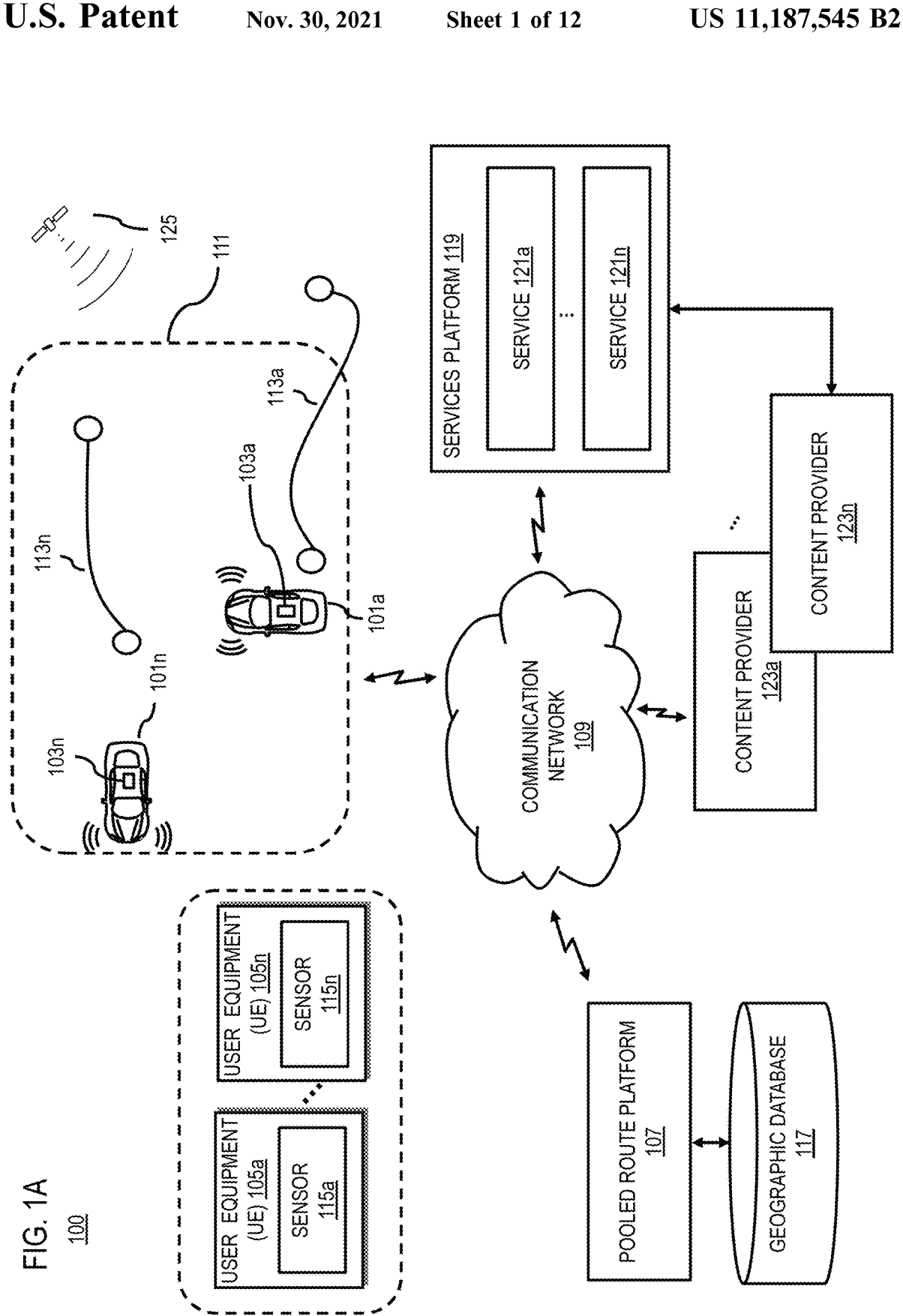

METHOD AND APPARATUS FOR GENERATING A POOLED ROUTE TO EXTEND A SERVICE AREA OF A SHARED VEHICLE

BACKGROUND

Shared vehicle service providers enable users to access vehicles upon request. Typically, the providers limit use of their pool of shared vehicles to one or more designated service areas for logistic, capacity or planning reasons. However, this also limits a user's ability to travel to destinations outside of the service areas using the shared vehicle. Accordingly, shared vehicle service providers are limited in their ability to extend their service area to support destinations outside the service area.

SOME EXAMPLE EMBODIMENTS

As a result, there is a need for generating a pooled route to extend a service area of a shared vehicle.

According to one embodiment, a computer-implemented method for generating a pooled route to extend a service area of a shared vehicle comprises receiving a request from a first user to travel a first route to a destination outside of the service area of the shared vehicle. The method also comprises determining a second user with a second route that uses the shared vehicle and that is within a threshold proximity, a threshold time, or a combination thereof of the first route, the destination, or a combination thereof. The method further comprises computing the pooled route for the first user to travel to the destination using the shared vehicle and for the second user to return the shared vehicle to the service area after the first user reaches the destination.

According to another embodiment, an apparatus for generating a pooled route to extend a service area of a shared vehicle comprises at least one processor, and at least one memory including computer program code for one or more computer programs, the at least one memory and the computer program code configured to, with the at least one processor, cause, at least in part, the apparatus to receive a request from a first user to travel a first route to a destination outside of the service area of the shared vehicle. The apparatus is also caused to determine a second user that has a second route using the shared vehicle. The apparatus is further caused to compute the pooled route for the first user to travel to the destination using the shared vehicle and for the second user to return the shared vehicle to the service area after the first user reaches the destination.

According to another embodiment, a non-transitory computer-readable storage medium for generating a pooled route to extend a service area of a shared vehicle, carries one or more sequences of one or more instructions which, when executed by one or more processors, cause, at least in part, an apparatus to identify a user of a vehicle, a location of the vehicle, a context of the vehicle, or a combination thereof. The apparatus is also caused to determine a privacy level set by the user, associated with the context, or a combination thereof. The apparatus is further caused to generate a personalized comment related to the location based on the privacy level, wherein the personalized comment includes privacy-sensitive data associated with the user. The apparatus is further caused to trigger a presentation of the personalized comment in a user interface of the vehicle, a device, or a combination thereof based on a proximity of the vehicle to the location.

According to another embodiment, an apparatus for generating a pooled route to extend a service area of a shared vehicle comprises means for receiving a request from a first user to travel a first route to a destination outside of the service area of the shared vehicle. The method also comprises determining a second user with a second route that uses the shared vehicle and that is within a threshold proximity, a threshold time, or a combination thereof of the first route, the destination, or a combination thereof. The method further comprises computing the pooled route for the first user to travel to the destination using the shared vehicle and for the second user to return the shared vehicle to the service area after the first user reaches the destination.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system for generating a pooled route to extend a service area of a shared vehicle, according to one embodiment;

DESCRIPTION OF SOME EMBODIMENTS

Figure 1B:
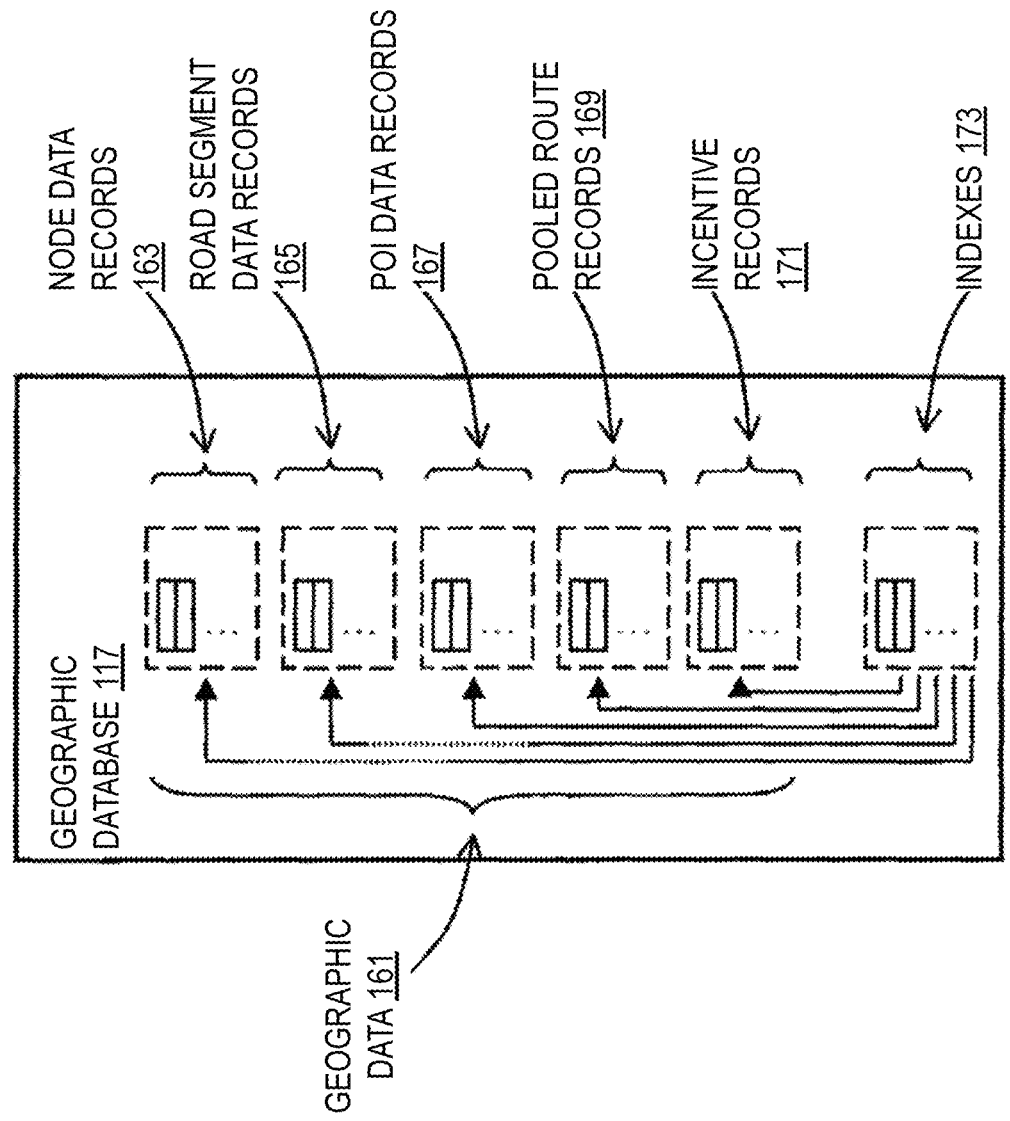
FIG. 1B is a diagram of a geographic database of the system of FIG. 1A, according to one embodiment.

Examples of a method, apparatus, and computer program for generating a pooled route to extend a service area of a shared vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system for generating a pooled route to extend a service area of a shared vehicle, according to one embodiment. As noted above, shared vehicle service providers enable users to access vehicles upon request from a pool of shared vehicles. Typically, users provide details regarding their current location, an intended pickup location from which they can access the vehicle, an intended travel destination and other pertinent information. To effectively manage the pool of shared vehicles against demand, location needs, vehicle service and maintenance needs, etc., the service provider typically restricts shared vehicle usage to a designated service area. Thus, the user is required to access and return the vehicle at locations within the bounds of the service area. Consequently, this limits the ability of users to travel to destinations outside the service area with a shared vehicle. Unfortunately, there is no effective means of extending an existing shared vehicle service area and/or scaling the pooled routes to accommodate users whose destinations lie outside the service area.

To address these technical problems, a system 100 of FIG. 1A is presented for enabling pooled routes to be computed in response to user requests for travel to a destination that is outside of the shared vehicle service provider's service area. By way of example, the shared vehicles (e.g., vehicles 101) within the pool of the service provider may be autonomous, semi-autonomous or manually-driven vehicles (e.g., cars, buses, scooters, etc.). For illustrative purposes herein, the vehicles 101 of the pool are considered manually-driven and thus principally operated by users. Thus, pick-up from and return of the vehicles to locations within the shared vehicle service area is the responsibility of users.

In one embodiment, the pooled route computed by system 100 can be associated with map data (e.g., map data of a geographic database 117). The map data may include digital map data, high resolution map data, indoor map data, etc., for specifying the pooled route relative to a geographic location. By way of example, the pooled route specifies a route for a requesting user to reach a destination that lies outside the service area of the shared vehicle service provider. Still further, the pooled route ensures the shared vehicle employed by the first user is returned to a location within the service area despite the destination being outside the service area.

In one embodiment, the system 100 queries the database to compute the pooled route. By way of example, the database may include map data as well as route information, user information and the like associated with the shared vehicle service. The map data may be assembled from sensor data, contextual data, or a combination thereof associated with current or historical user devices and/or users of the shared vehicle service. Map data can be combined with historical data for the same geographic areas of interest (e.g., the location in which users are expected to drive to). The historical data, for instance, comprises data collected on vehicle drives or trajectories (e.g., vehicle probe data representing historical travel data as a sequence of time-ordered vehicle and heading measurements) for indicating user mobility patterns, corresponding user events (e.g., concerts, festivals, parades, etc.) and/or activities (e.g., sightseeing, biking, shopping, etc.) taking place at locations along a route of the vehicle, and/or other related data (e.g., weather, visibility, etc. at the time of the drive).

The system 100 further determines a contextual match between a first route of a first user seeking travel to a destination outside the service area and a second route of a second user of the same shared vehicle service. In one embodiment, the contextual match is based on a threshold proximity—i.e., a distance, location or range—associated with the first route, the second route and the destination. By way of example, the proximity threshold may indicate a detour distance, an extent of route deviation, an extent of mobility pattern deviation, or the like between a first and second route of the respective first user and second user of the shared vehicle service. Still further, the proximity of the first user's and second user's starting location, destination, or a combination thereof may be determined.

In another embodiment, the contextual match is further based on a threshold time associated with the first route, the second route and the destination. For instance, the threshold time may indicate whether the second user of the shared vehicle travelling the second route (or anticipated to travel the second route) is within an acceptable timeframe of fulfillment of the first user's travel request.

In one embodiment, the system 100 provides data for presenting the computed pooled route as as a selection option for the first user, the second user, or a combination thereof. The option may be presented to a user interface of a device (e.g., user equipment (UE) 105) of the first user, second user, or a combination thereof. Still further, in another embodiment, the option may be presented in connection with an incentive for eliciting acceptance by the first user, second user or a combination thereof, of the pooled route option. By way of example, the incentive may be a monetary value, a discount value, a cost sharing scenario, a social ranking or status, a shared vehicle type (e.g., a larger sized vehicle, a premium vehicle), a route, trip or experience type (e.g., scenic route, tourist route), or a combination thereof. In certain instances, the incentive may be provided by the shared vehicle service provider, a content provider (e.g., content provider 123), a services platform (e.g., service platform 123) for rendering one or more services (e.g., service 121), a third-party associated with or within proximity of the pooled route (e.g., a retailer, merchant), etc. It is further contemplated, in certain embodiments, that users may generate and present custom incentives for eliciting participation between respective other shared vehicle users.

In one embodiment, the system 100 presents the pooled route, associated incentive, or a combination thereof in an audio interface, a haptic interface, and/or a visual interface. Such haptic interfaces apply haptic technologies that recreate the sense of touch by applying forces, vibrations, and/or motions to the user, such as simulating an activity/event like an earthquake, a car accident, etc. using vehicles 103, UE 105, etc. Such visual interfaces may include a two-dimensional (2D), three-dimensional (3D), augmented reality (AR), and/or virtual reality (VR) view inside a vehicle, such as on a window (e.g., a vehicle windshield, a heads-up display, etc.) or in a display (e.g., a handheld display such as a mobile phone or an integrated dashboard or headrest display).

In one instance, the user interface could also be a goggle or an eyeglass device used separately or in connection with a mobile device. In one embodiment, the system 100 can present or surface the pooled route option and corresponding incentive in multiple interfaces simultaneously (e.g., presenting a 2D map, a 3D map, an AR view, a VR display, or a combination thereof). In one instance, the system 100 can present the pooled route option and corresponding incentive through multiple interfaces within the vehicle, including initiating display of the selected option based on the location or positioning of the user (e.g., a passenger side windshield for presentment to the driving user). In one embodiment, the system 100 could also present the pooled route option and corresponding incentive through one or more sounds, i.e., through the speakers of the vehicle.

It is contemplated, for example, the above described audio, haptic or visual interfaces be rendered to the above described device by the system 100 in response to a requested destination, requested first route, intended destination, intended first route, or a combination thereof of the first user. By way of example, a second user actively driving a shared vehicle featuring said internal interfaces can view the pooled route option, accept the pooled route option and/or corresponding incentive via the internal interface, then navigate the pooled route accordingly.

In one embodiment, the system 100 can detect user context via sensor data, profile information associated with the user per the shared vehicle service, information associated with the user during use of map data per the geographic database 117 (e.g., via a mapping application operable on a mobile device), etc. The user contextual data may include profile data, user preferences, user behaviors/activities in the vehicle, incentive preferences, etc. The vehicle contextual data may include, for example, mapping or route information, object movement information (e.g., static versus moving), status information (e.g., traffic light status, construction status, etc.), time of day, weather conditions, visibility, historical route data, etc. In one embodiment, the system 100 collects the sensor data, contextual data, or a combination thereof through camera sensors, light sensors, Light Imaging Detection and Ranging (Lidar) sensors, Radio Detection and Ranging (Radar), infrared sensors, thermal sensors and the like.

In one embodiment, the system 100 can compute different pooled route options that originate from within the service area. For example, a pooled route option may include the second user (serving as driver) picking up the first user (as a passenger) within the service area of the shared vehicle service provider, travelling to and dropping off the first user at a destination outside the service area, then returning the vehicle to a second destination of the second user within the service area. In another example, the first user (serving as driver initially) may be presented the option of picking up the second user (as a passenger initially) within the service area, travelling to a destination of the first user outside the service area, handing off the vehicle to the second user (as driver), then the second user returning the vehicle to a second destination within the service area. In yet another example, a pooled route option may include the first user (serving as driver) accessing the vehicle within the service area, travelling to a first destination outside the service area, then immediately handing off the vehicle to a second user travelling to a second destination within the service area.

It is contemplated, in various embodiments, that multiple pooled route options may be determined for ensuring return of the vehicle to the service area. Furthermore, while presented herein with respect to a first user and second user, the system 100 may calculate a pooled route option for an unlimited number of users of the shared vehicle service originating from the service area based on a determined threshold proximity, threshold time of each respective user's route and destination. Under this scenario, driving roles, passenger roles, timing considerations, hand-offs, etc., may be presented accordingly.

In one embodiment, the system 100 can store a selected pooled route option in association with profile information of the first user, the second user, or a combination thereof. Under this approach, the system 100 may recall and present a prior computed pool route option based on contextual information regarding the first and second user—i.e., time of day, day of the week, venue or destination preferences.

As shown in FIG. 1A, the system 100 comprises one or more vehicles 101a-101n (also collectively referred to herein as vehicles 101). In one embodiment, the vehicles 101 make up a pool or fleet of a shared vehicle service provider and may be manually-driven by users to navigate to destinations within a service area 111. Users may request access to the vehicles by way of one or more user equipment (UE) 105a-105n (also collectively referred to herein as UEs 105) for connecting to a pooled route platform 107 via a communication network 109.

In one embodiment, the vehicles may be configured with one or more vehicle sensors 103a-103n (also collectively referred to herein as vehicle sensors 103), one or more integrated user equipment UE 105, or a combination thereof for connecting to the pooled route platform 107 via the communication network 109. The vehicle sensors 103 (e.g., camera sensors, light sensors, Lidar sensors, radar, infrared sensors, thermal sensors, and the like) may acquire map data during an operation of the vehicle 101 along one or more routes 113a-113n (also collectively referred to herein as routes 113).

The routes 113 include origination points within the service area 111 but may have destination points that lie outside the service area 111. By way of example, the map data may include mapping or route information, traffic status information (e.g., traffic light status, construction status, etc., time of day, weather conditions, visibility information, historical data, etc.) and the like.

By way of example, the UE 105 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 105 can support any type of interface to the user (such as "wearable" circuitry, etc.).

In one embodiment, the one or more vehicles may have cellular or wireless fidelity (Wi-Fi) connection either through the inbuilt communication equipment or from the UE 105 associated with the vehicles 101. Also, the UEs 105 may be configured to access a communication network 109 by way of any known or still developing communication protocols. As such, a user without access to their own UE 105 can interact with the pooled route platform 107 upon gaining access to the vehicle 103. Alternatively, the user's UE 105 (e.g., mobile device) may interact with the UE 105 integrated within the vehicle. The UEs 101 may also be configured with various sensors 115a-115 (also collectively referred to herein as sensors 115) for collecting sensor data regarding the user, vehicle, environment, etc., during operation of the vehicle 101 along one or more routes 113 within the service area 111.

In one embodiment, the vehicles 101 also have connectivity to a pooled route platform 107 over the communication network 109. In one embodiment, the pooled route platform 107 performs the process for generating a pooled route to extend a service area of a shared vehicle as discussed with respect to the various embodiments described herein. In one embodiment, the pooled route platform 107 may be a cloud-based platform that collects and processes sensor data from sensors 103 and 115, contextual data regarding the passengers and the vehicle 101's surroundings, or a combination thereof. Alternatively, the pooled route platform 107 can be a standalone server or a component of another device with connectivity to the communication network 109. For example, the component can be part of an edge computing network where remote computing devices (not shown) are installed along or within proximity of the service area 111.

In one embodiment, the pooled route platform 107 performs functions related to generating mapping data (e.g., location-based records) related to static objects proximate to the vehicle 101 (e.g., vehicles, pedestrians, traffic lights, etc.) along a route 113 and correlates them to geographic areas described in a geographic database 117. In one embodiment, the pooled route platform 107 has connectivity over the communication network 109 to the services platform 119 (e.g., an OEM platform) that provides one or more services 121a-121n (also collectively referred to herein as services 121) (e.g., sensor data collection services). By way of example, the services 121 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 123a-123n (collectively referred to as content providers 123) may provide content or data (e.g., including geographic data, parametric representations of mapped features, historical data, etc.) to the geographic database 117, the pooled route platform 107, the services platform 119, the services 121, and the vehicles 101. The content provided 123 may be any type of content, such as map content (e.g., routes 113), contextual content, audio content, video content, image content, etc. In one embodiment, the content providers 123 may also store content associated with the geographic database 117, pooled route platform 107, services platform 119, services 121, and/or vehicles 101. In another embodiment, the content providers 123 may manage access to a central repository of data, and offer a consistent, standard interface to data, such as a repository of the geographic database 117.

By way of example, as previously stated the vehicle sensors 103 may be any type of sensor. In certain embodiments, the vehicle sensors 103 may include, for example, a global positioning sensor for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., for detecting objects proximate to the vehicle 101a), an audio recorder for gathering audio data (e.g., detecting nearby humans or animals via acoustic signatures such as voices or animal noises), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles (e.g., vehicle 101n), pedestrians, animals, traffic lights, road features (e.g., curves) and any other objects, or a combination thereof. In one scenario, the vehicle sensors 103 may detect weather data, traffic information, or a combination thereof. In one example embodiment, the vehicles may include GPS receivers to obtain geographic coordinates from satellites 125 for determining current location and time. Further, the location can be determined by a triangulation system such as A-GPS, Cell of Origin, or other location extrapolation technologies when cellular or network signals are available. In another example embodiment, the one or more vehicle sensors 103 may provide in-vehicle navigation services.

The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the pooled route platform 107 may be a platform with multiple interconnected components. By way of example, the pooled route platform 107 may include multiple servers, intelligent networking devices, computing devices, components and corresponding software for determining upcoming vehicle events for one or more locations based, at least in part, on signage information. In addition, it is noted that the pooled route platform 107 may be a separate entity of the system 100, a part of the services platform 119, the one or more services 121, or the content providers 123.

In one embodiment, the geographic database 117 stores information on road links (e.g., road length, road breadth, slope information, curvature information, etc.), probe data for one or more road links 113 (e.g., traffic density information), and historical accident data associated the road links 113 or other geographic areas within the service area 111. The information may be any of multiple types of information that can provide means for triggering vehicle sensor activation based on proximate object detection. In another embodiment, the geographic database 117 may be in a cloud and/or in a vehicle 101 (e.g., an autonomous car) and/or a mobile device (e.g., a UE 105).

By way of example, the vehicles 101, the UEs 105, the pooled route platform 107, the services platform 119, and the content providers 123 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 117 of the system 100, according to exemplary embodiments. In the exemplary embodiments, map data, contextual data, privacy-respectful and personalized location-based comments, relevance data, confidence data, etc. can be stored, associated with, and/or linked to the geographic database 117 or data thereof. In one embodiment, the geographic or map database 117 includes geographic data 161 used for (or configured to be compiled to be used for) mapping and/or navigation-related services, such as for triggering privacy-respectful and personalized location-based comments as discussed in the various embodiments described herein. The geographic data 161 can also be used for personalized route determination, according to exemplary embodiments. For example, the geographic database 117 includes node data records 163, road segment or link data records 165, POI data records 167, comment data records 169, passenger records 171, and indexes 173 for example. More, fewer or different data records can be provided. In one embodiment, the additional data records (not shown) can include cartographic ("carto") data records, routing data, and maneuver data. In one embodiment, the indexes 173 may improve the speed of data retrieval operations in the geographic database 117. For example, the indexes 173 may be used to quickly locate data without having to search every row in the geographic database 117 every time it is accessed.

In exemplary embodiments, the road segment data records 165 are links or segments representing routes (e.g., route 113 of the service area 111), roads, streets, parking areas, or paths, as can be used in the calculated route or recorded route information for determination of one or more personalized routes, according to exemplary embodiments. The node data records 163 are end points corresponding to the respective links or segments of the road segment data records 165. The road link data records 165 and the node data records 163 represent a road network or service area 111, such as used by vehicles, cars, and/or other entities. Alternatively, the geographic database 117 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 117 can include data about the POIs and their respective locations in the POI data records 167. The geographic database 117 can also include data about places, such as cities, towns, or other communities, and other geographic features, such as bodies of water, mountain ranges, etc. Such place or feature data can be part of the POI data 167 or can be associated with POIs or POI data records 167 (such as a data point used for displaying or representing a position of a city).

In one embodiment, the geographic database 117 also includes pooled route records 169. For example, a pooled route record 169 may specify a pooled route option selected in the past by a user, a computed pooled route option generated for the user, etc. In another embodiment, the geographic database 117 includes incentive records 171, for specifying one or more incentives associated with one or more pooled route records. The incentive records may be derived from a variety of sources, including but not limited to online data sources, offline data sources, or a combination thereof associated with the user, the shared vehicle service provider, the routes 113, etc.

The geographic database 117 can be maintained by the content provider 123 in association with the services platform 119 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database 117 or data in the master geographic database 117 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as a navigation system of the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 117 can be a master geographic database, but in alternate embodiments, the geographic database 117 can represent a compiled navigation database that can be used in or with end user devices (e.g., vehicles 101, UEs 105) to provide navigation-related functions or location-based functions (e.g., triggering vehicle sensor activation based on objects such as a second vehicle crossing the path and route of the vehicle 101a). For example, the geographic database 117 can be used with the vehicle 101 to provide an end user with navigation features. In such a case, the geographic database 117 can be downloaded or stored in a navigation system of the vehicle 101, or the vehicle 101 can access the geographic database 117 through a data connection over the communication network 109, for example.

Figure 2:
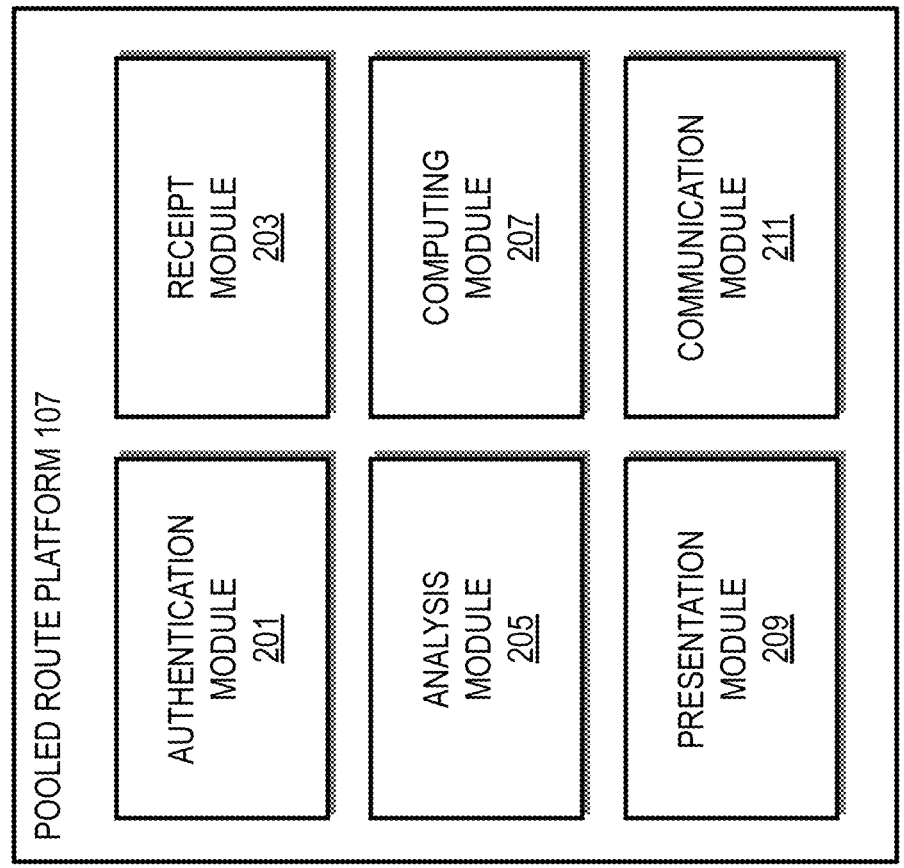
FIG. 2 is a diagram of the components of a pooled route platform, according to one embodiment.

FIG. 2 is a diagram of the components of a pooled route platform 107, according to one embodiment. By way of example, the pooled route platform 107 includes one or more components for presenting privacy-respectful and personalized location-based comments based on passenger context and vehicle proximity to the location (e.g., an autonomous vehicle). It is contemplated that the functions of these components may be combined in one or more components or performed by other components of equivalent functionality. In one embodiment, the pooled route platform 107 includes an authentication module 201, an analysis module 203, a privacy module 205, a comment processing module 207, a presentation module 209, and a routing module 211. The above presented modules and components of the pooled route platform 107 can be implemented in hardware, firmware, software, or a combination thereof. Though depicted as a separate entity in FIG. 1A, it is contemplated the pooled route platform 107 may be implemented as a module of any of the components of the system 100. In another embodiment, the pooled route platform 107 and/or one or more of the modules 201-211 may be implemented as a cloud-based service, local service, native application, or combination thereof. The functions of the pooled route platform 107 and the modules 201-211 are discussed with respect to FIGS. 3-6 below.

In one embodiment, the authentication module 201 authenticates UEs 101 and/or associated vehicles 103 for interaction with the pooled route platform 107. By way of example, the authentication module 201 receives a request to access the pooled route platform 107. The request may be submitted to the authentication module 201 via the communication module 209, which enables an interface between the UEs 101 and/or associated vehicles 103 and the pooled route platform 107. In addition, the authentication module 201 may provide and/or validate access by the UE 101 to upload sensor data, trajectory data, and/or other location-based information to the pooled route platform 107. In one embodiment, the authentication module 201 may further be configured to support and/or validate the formation of a user profile by a provider of a service or content provider, e.g., for supporting integration of the capabilities for presenting pooled route options.

The receipt module 203 receives an input from an authenticated user of the pooled route platform 107 to travel to a destination or along a route 113 using a shared vehicle 103. In one instance, the input may include a request by the user to travel to the destination, whether within the service area 111 or not. The request may further include time information associated with the request for use of the shared vehicle—i.e., an anticipated or current time of travel. In addition, the receipt module 203 may receive map data within the geographic database 117, pooled route records 169 and sensor data generated by sensors 103 and/or 115 in connection with the request. The sensor data may be collected by the sensors 115 and sent to the analysis module 203 to determine context data associated with the requesting user, the vehicle 103, the UE 105, etc.

In one embodiment, the analysis module 205 analyzes the input and determines whether another user of a shared vehicle is a contextual match with the requesting user. By way of example, the analysis module 205 determines if the other user, having current access to a shared vehicle 103 or anticipated to have access to a shared vehicle, is within a threshold proximity of the route of the requesting user, the destination or a combination thereof. The threshold proximity may specify a maximum detour distance between the other route and the requested route. Furthermore, the analysis module 205 determines if the other user is within a threshold time of the requested route, the destination, or a combination thereof. The threshold time may specify a maximum travel time difference between the other route and the requested route.

In another embodiment, the computing module 207 interacts with the analysis module 205 to compute the pooled route for the requesting user to travel to a destination outside the service area using the shared vehicle and for the other user to return the shared vehicle to the service area after the first user reaches the destination. The computation is based on the analysis, contextual data provided by the sensors 103 of the vehicles 101, and/or sensors 115 of respective UE 105 of the users. Still further, the computation may be based on data stored in the geographic database 161, such as road segment data records 165, pooled route records 169, etc.

The computing module 207 may further determine an incentive to associate with the computed pooled route for the requesting user. By way of example, the incentive may be a monetary value, a discount value, a cost sharing scenario, a social ranking or status, a shared vehicle type (e.g., a larger sized vehicle, a premium vehicle), a route, trip or experience type (e.g., scenic route, tourist route), or a combination thereof. In certain instances, the incentive may be provided to the computing module 207 (e.g., via the receipt module 203) by the shared vehicle service provider, a content provider (e.g., content provider 123), a services platform (e.g., service platform 123) for rendering one or more services (e.g., service 121), a third-party associated with or within proximity of the pooled route (e.g., a retailer, merchant), etc. Alternatively, other users having access to the pooled route platform 107 may generate and present custom incentives for eliciting participation between respective other shared vehicle users.

The presentation module 209 presents one or more computed pooled route options to a user interface of the requesting user, the user interface of another user whose route is determined by the computing module 207 as a contextual match for the destination and/or route of the requesting user, or a combination thereof. The apparatus module 209 also presents one or more incentives associated with the one or more pooled routes. The receiving users may accept a pooled route option or associated incentive as presented. By way of example, the user interface can include any type of UE 105 (e.g., a mobile device or an in-dash navigation display). In one embodiment, the interface includes a user interface element configured to receive a user input (e.g., a knob, a joystick, a rollerball or trackball-based interface, a touch screen, etc.) to enable a user/passenger to specify a parameter or the comment presentation.

Still further, the presentation module 209 can interact with UE 105 to render content in various forms. For example, the presentation module 209 can present or surface the pooled routes in multiple interfaces simultaneously (e.g., presenting an AR view on a windshield and a 2D map in a display). In another instance, the presentation module 209 can present the pooled routes to UE of different form factors—i.e., tablet vs wearable device—or render the pooled route as audible instructions. In one use case, a user (e.g., trip seeker) may need to accomplish a task in an area outside of the service area of a shared vehicle (e.g., pick up something or see someone, but not urgently). The user can request a trip outside of the service area, and then the presentation module 209 can notify the day and/or time that someone else (e.g., a potential driver) plans a route passing or going to the same place. Because the trip is not urgent the trip seeker can wait for an opportunistic trip until another user becomes available to take the user to the outside destination. When an opportunistic trip arises, the presentation module 209 can present the corresponding pooled route to the user to accept or wait for another opportunity. In one embodiment, the user can specify how much advanced warning of an opportunistic trip is needed. For example, the system 100 can present trips a day or more in advance but there may fewer opportunities with this much advanced warning, or an hour or less with greater potential for spontaneous and unexpected opportunities.

It is further noted that the user interface may operate in connection with the communication module 211 to facilitate the exchange of real-time location information and/or vehicle information via the communication network 109 with respect to the services 121, content providers 123. Alternatively, the communication module 211 may facilitate transmission of the real-time location information and/or the vehicle information directly to the services 121 or content providers 123.

The above presented modules 201-211 and components of the pooled route platform 107 can be implemented in hardware, firmware, software, or a combination thereof.

Figure 3:
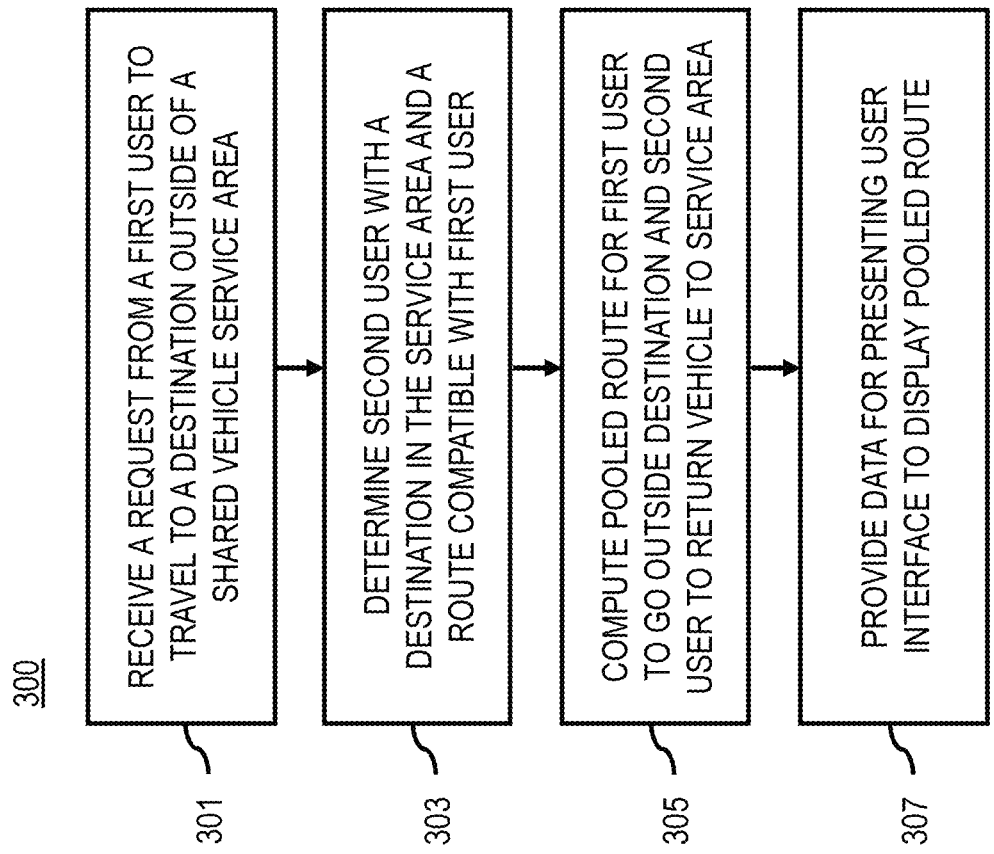
FIG. 3 is a flowchart of a process for generating a pooled route to extend a service area of a shared vehicle, according to one embodiment.

FIG. 3 is a flowchart of a process for generating a pooled route to extend a service area of a shared vehicle, according to one embodiment. In various embodiments, the pooled route platform 107 and/or the modules 201-211 of the pooled route platform 107 as shown in FIG. 2 may perform one or more portions of the process 300 and may be implement in, for instance, a chip set including a processor and a memory as shown in FIG. 9. As such, the pooled route platform 107 and/or the modules 201-211 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all the illustrated steps.

In step 301, the pooled route platform 107 receives a request from a first user to travel a first route to a destination outside of the service area of the shared vehicle. This process is illustrated with respect to FIG. 4A, which is a diagram of an exemplary pooled route for extending a service area of a shared vehicle, according to one embodiment. By way of example, a first user (User A) submits a request to the pooled route platform 107 to travel from a starting location 403 within the service area 401a to a destination 405 outside the service area 401. Under this scenario, the service area 401 is not contiguous and therefore includes an area 401a and 401b. The route to be travelled by User A is shown as route 407.

Figure 4A:
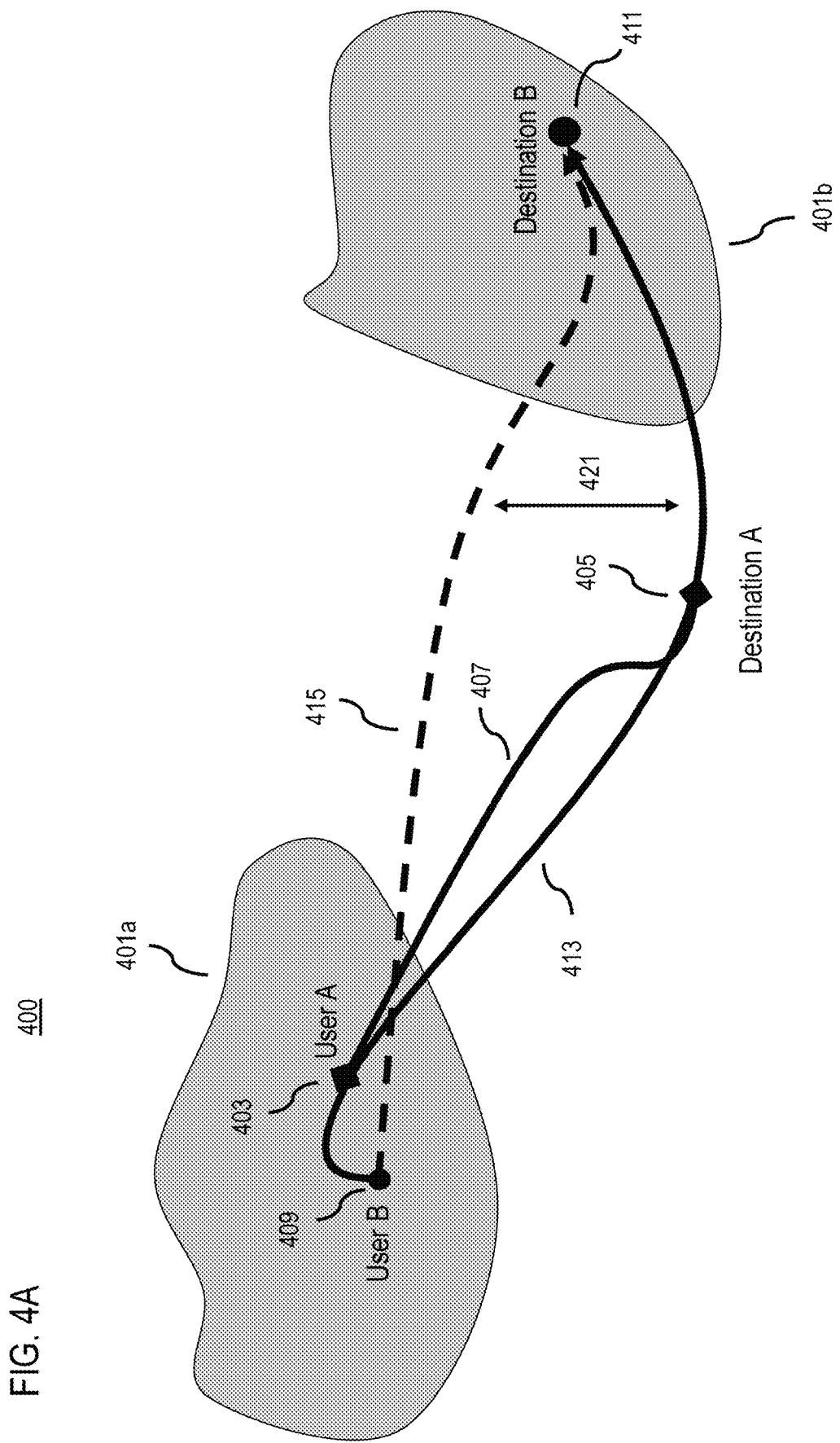
FIGS. 4A though 4C are diagrams of exemplary pooled routes for extending a service area of a shared vehicle, according to various embodiments.

In step 303, the pooled route platform 107 determines a second user with a second route that uses the shared vehicle and that is within a threshold proximity, a threshold time, or a combination thereof of the first route, the destination, or a combination thereof. In another step 305, the pooled route platform 107 computes the pooled route for the first user to travel to the destination using the shared vehicle and for the second user to return the shared vehicle to the service area after the first user reaches the destination. As shown in FIG. 4A, the second user (User B) is determined to be travelling a route 415 originating from a starting location 409 to a second destination 411. Route 415 represents the shortest, optimal route from starting location 409 to the second destination 411. However, upon receipt of the request, the pooled route platform 107 determines the second user (User B) meets the threshold proximity and threshold time criteria of the first route 407 and the destination 405 outside the service area.

Resultantly, the pooled route platform 107 computes a new route option to be travelled by the second user (User B) in response to the determination. Under this scenario, the new route 413 represents the pooled route to be travelled by User B to accommodate the destination need 405 of User A. The pooled route 413 specifies the option of User B deviating from the original/optimal route 415 to pick-up User A at location 403, travelling to the first destination 405 to drop-off User A, then proceeding to the second destination 411. This results in the shared vehicle being returned to the service area 401 accordingly.

It is noted, per the above example, that the second user (User B) is further determined based on a proximity to the first user (User A) and a proximity of a destination of the second route (original/optimal route 415) to the destination 405 of the first route 407. Furthermore, the threshold proximity is based on a maximum detour distance, i.e., as represented by distance line 421, between the second route 415 and the pooled route 413. Still further, the threshold time is based on a maximum travel time difference between the second route and the pooled route. The pooled route platform 103 can compute the proximity, detour distance, travel time distance, etc., at different points between respective routes.

Figure 4B:
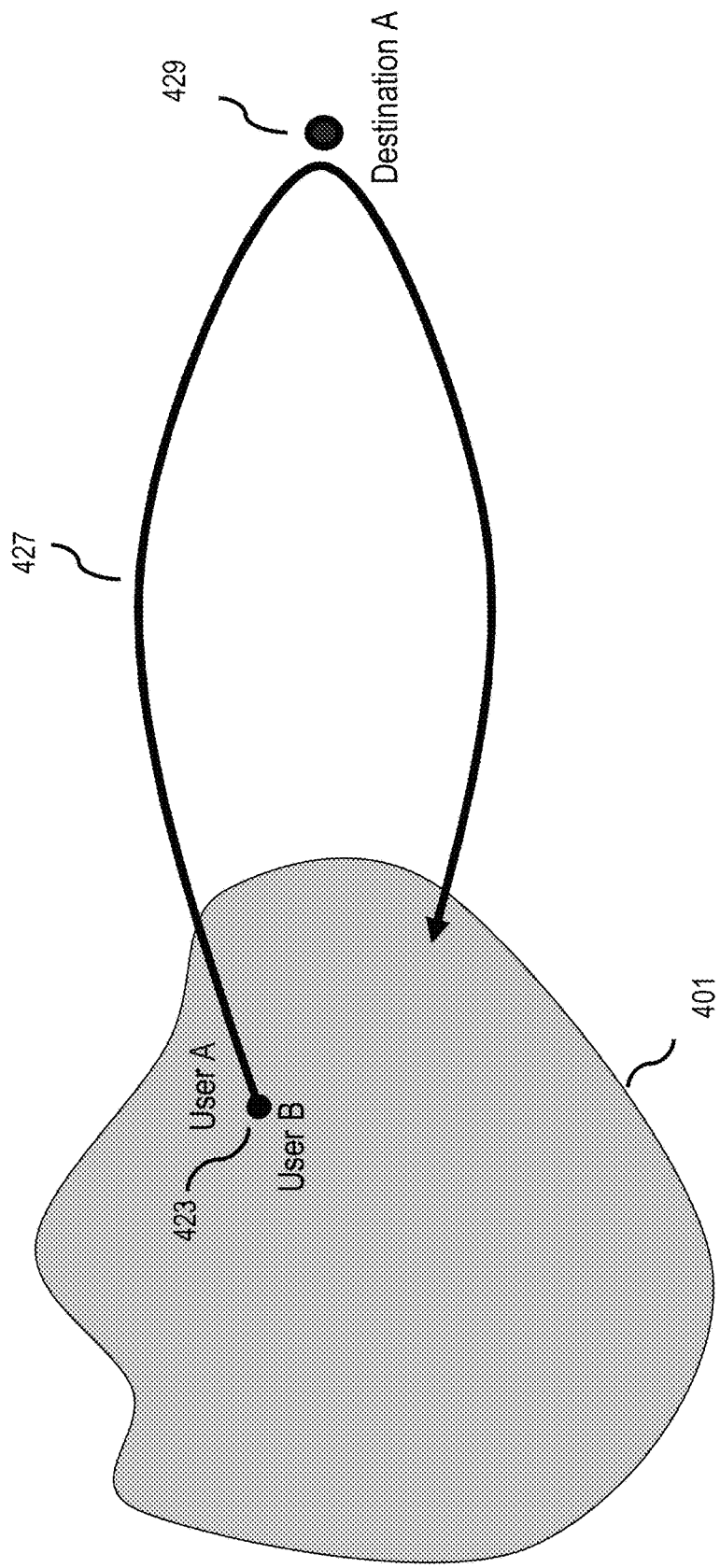

In FIG. 4B, another exemplary pooled route is shown. Under this scenario, the first user (User A) and second user (User B) originate from the same location 423 within the service area 401. The second user is presented with an option to drive a route 427, wherein the second user drives the first user to their intended destination 429 outside the service area 401 then returns the vehicle back to the service area 401.

Figure 4C:
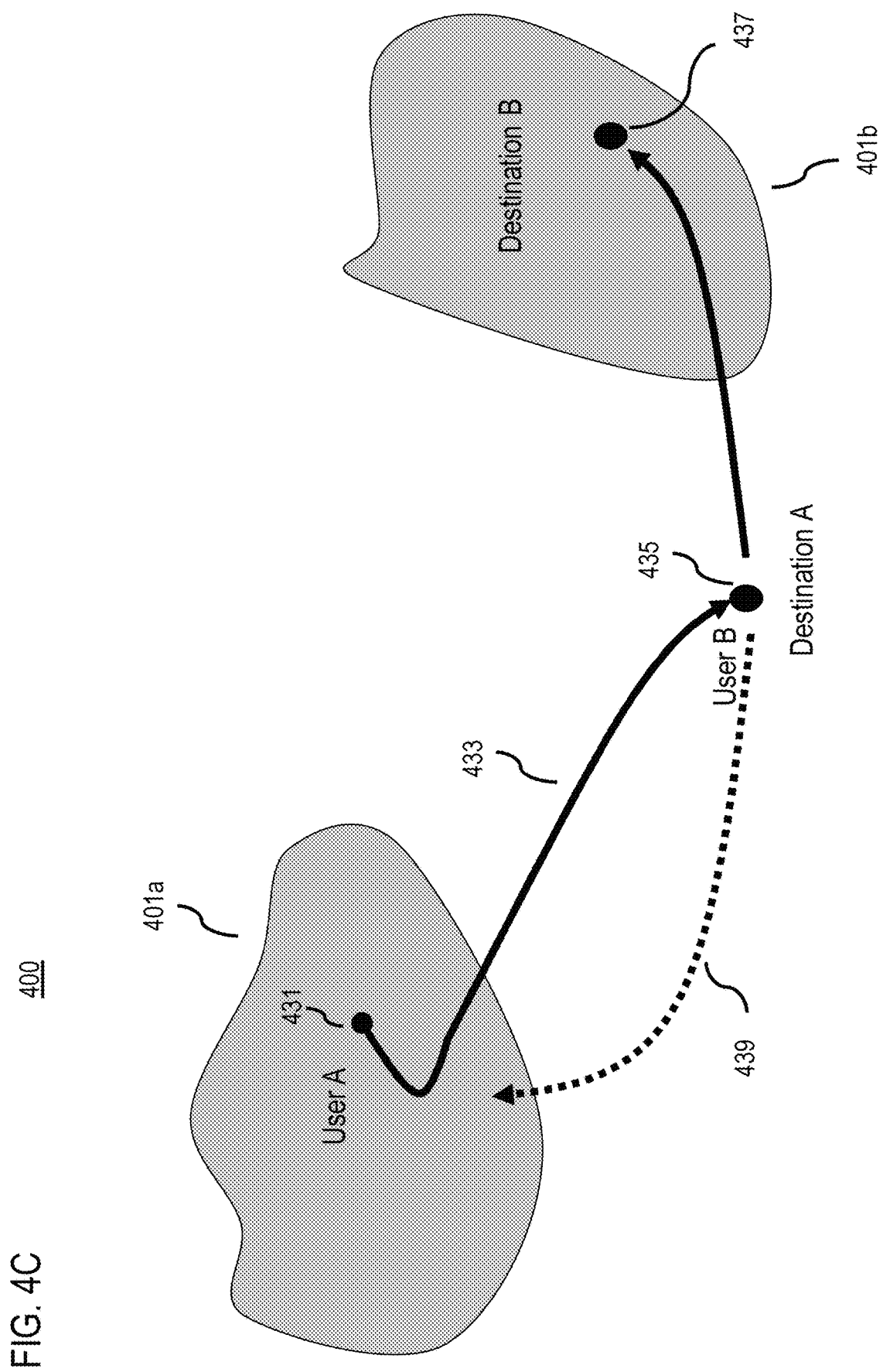

In FIG. 4C, another exemplary pooled route is shown. Under this scenario, the first user (User A) originates from location 431 within the service area 401 to reach a destination 435 by way of a first route 433. The first user hands-off the shared vehicle to User B, who is located at the destination 435, once the first user reaches the destination. User B then drives the shared vehicle to their desired destination 437, which ensures the vehicle is returned to the service areas 401b. Alternatively, User B can return the vehicle back to a location within the originating service area 401a's destination 437 by way of route 439.

Figure 5A:
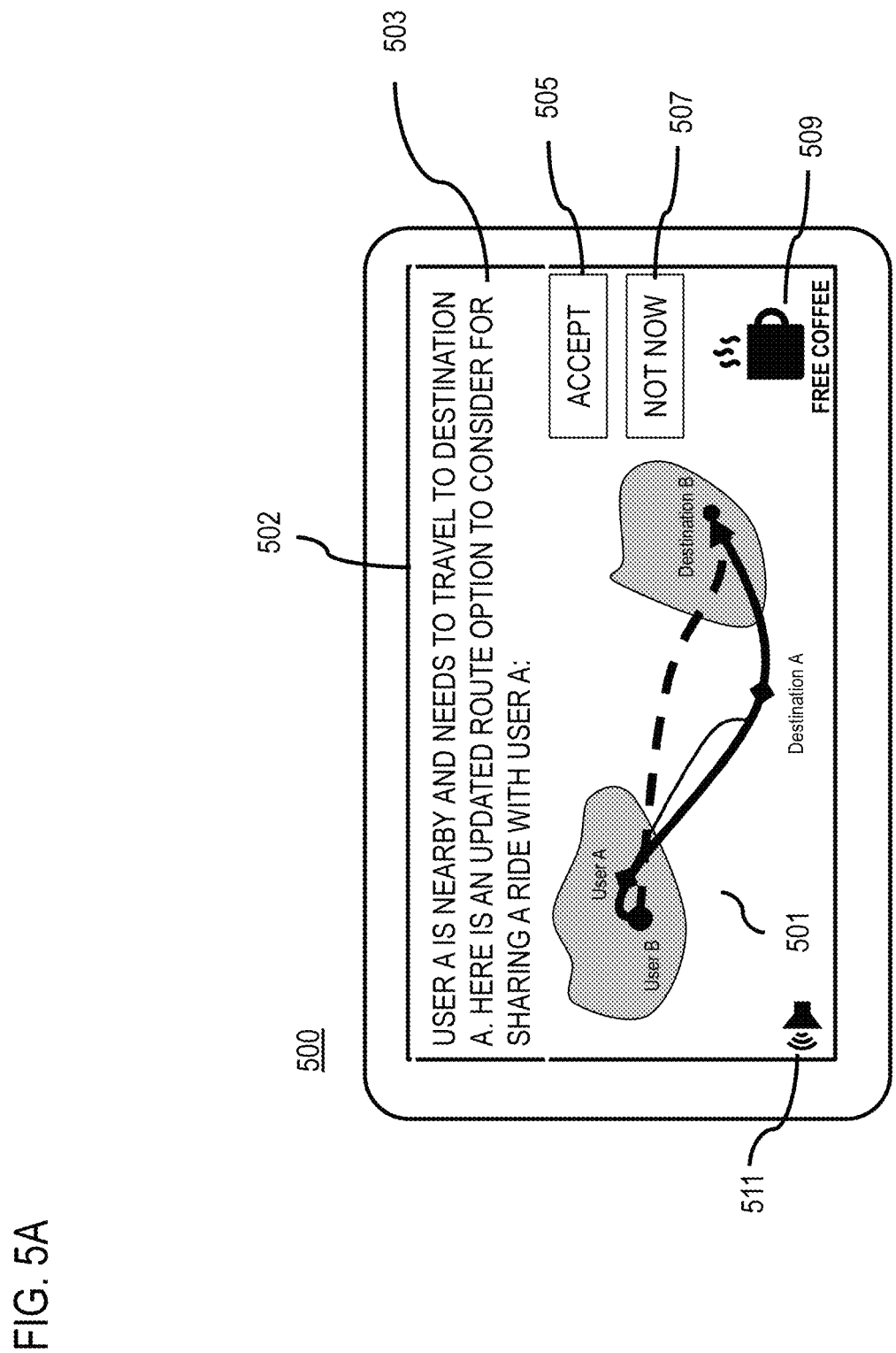
FIGS. 5A and 5B are diagrams of user interfaces of devices for interacting with the pooled route platform to extend a service area of a shared vehicle, according to various embodiments.
Figure 5B:
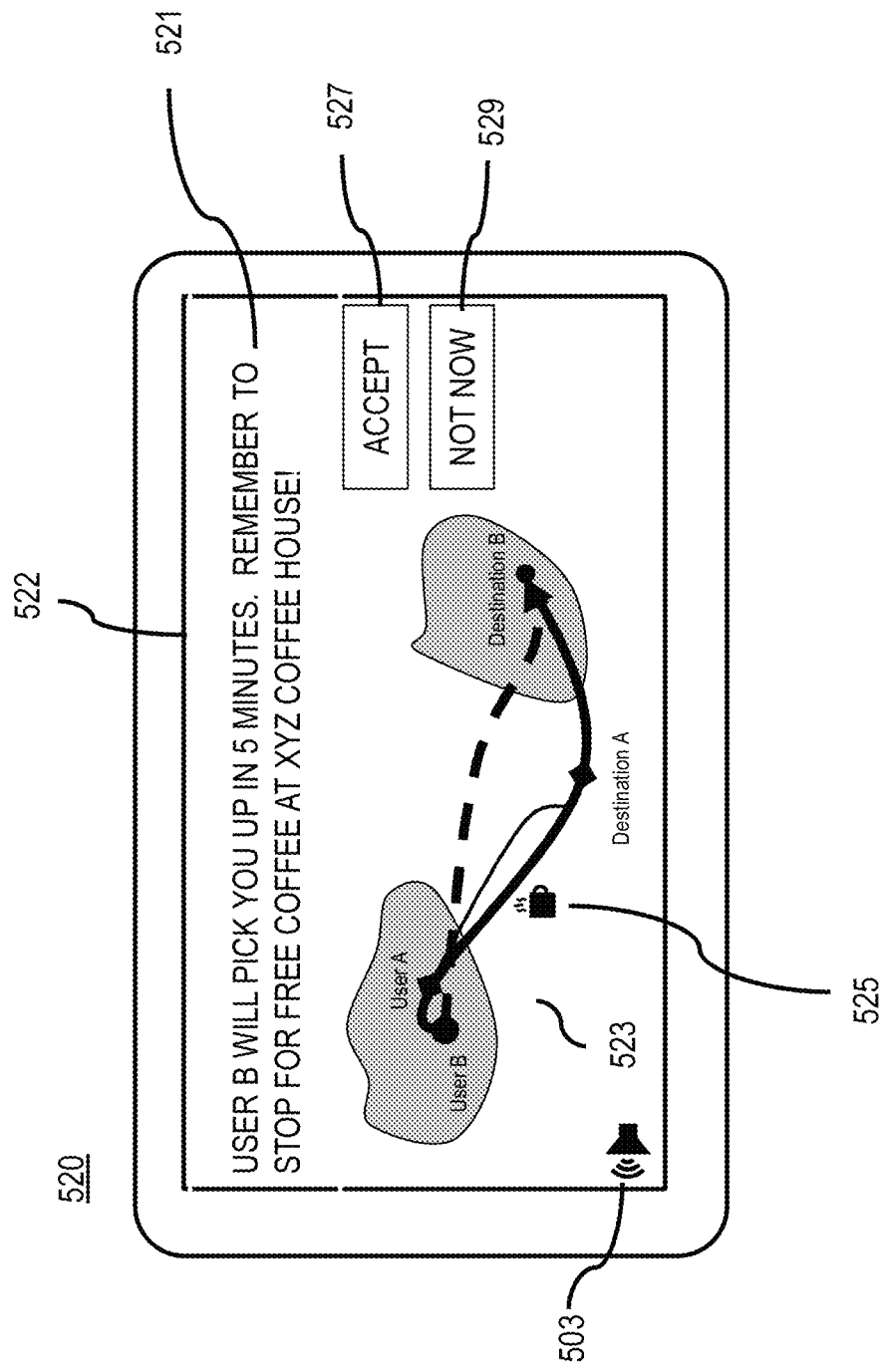

FIGS. 5A and 5B are diagrams of user interfaces of devices for interacting with the pooled route platform to extend a service area of a shared vehicle, according to various embodiments. For illustrative purposes, the user interface corresponds to the pooled route option computed with respect to FIG. 4A. Per this scenario, FIG. 5A is a user device 500 belonging to User B while FIG. 5B is a user device 520 belonging to User A.

In FIG. 5A, a pooled route option is presented to the user interface 502. The option includes a message 503 for indicating User A's need to travel to a destination. In addition, the option presents a visual representation of the route 501, i.e., as produced based on geographic data within the geographic database 117. The pooled route option also specifies an incentive, as represented by icon 509, for indicating User B will be treated to free coffee if they accept the pooled route option. Alternatively, the pooled route option and associated incentive can be presented audibly, as represented by the audio icon 511. User B can select the ACCEPT button 505 to specify acceptance of the pooled route option and incentive or select the NOT NOW button 507 to reject the option.

In FIG. 5B, a pooled route option is presented to the user interface 522 of User A's device 520. The option includes an acceptance message 521 for indicating User B accepted the pooled route option. In this example, the message 521 states "User B will pick you up in 5 minutes" and provides additional context or information on the associated incentive for why the user would or could accept the pooled route to make a stop (e.g., "Remember to stop for free coffee at XYZ Coffee House"). In addition, the option presents a visual representation of the route 523, i.e., as produced based on geographic data within the geographic database 117. The pooled route option also indicates how to fulfill or execute the incentive presented to User B, which in this case is represented by icon 525 being presented along the pooled route presented in the diagram 523. Alternatively, the message can be presented audibly, as represented by the audio icon 511. User A can select the ACCEPT button 527 to specify acceptance of the pooled route option and incentive or select the NOT NOW button 529 to reject the option.

The computation of the different embodiments mentioned above can be done partially or totally on servers/cloud, or at the edge of the network to balance the network load/cellular usage. The above-discussed embodiments enable the computation and presentment of pooled routes for extending a service area of a shared vehicle.

The processes described herein for generating pooled routes for extending a service area of a shared vehicle may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

The processes described herein for generating a pooled route to extend a service area of a shared vehicle may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
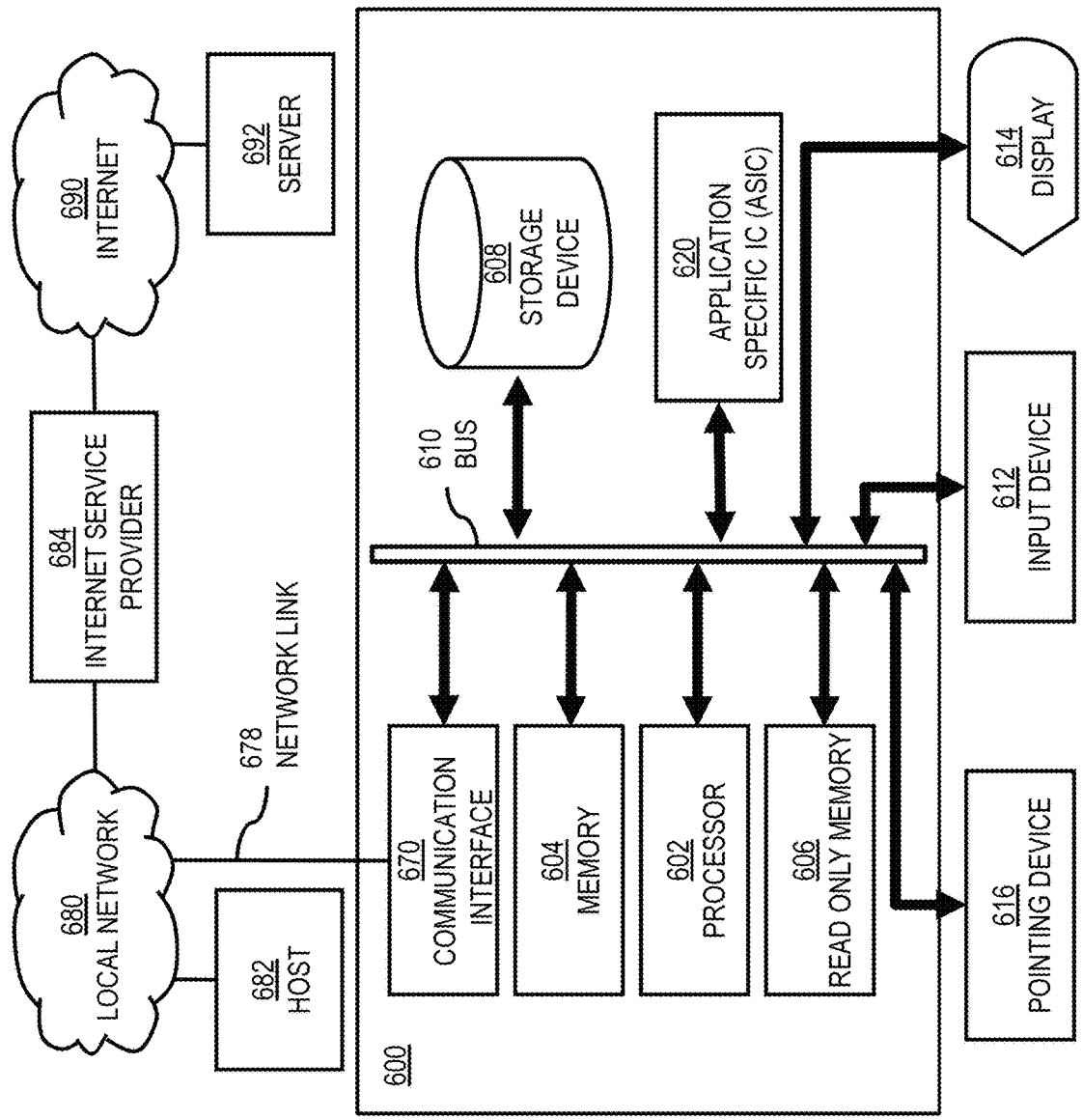
FIG. 6 is a diagram of hardware that can be used to implement an embodiment of the invention.

FIG. 6 illustrates a computer system 600 upon which an embodiment of the invention may be implemented. Although computer system 600 is depicted with respect to a device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate a pooled route to extend a service area of a shared vehicle as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a range. Computer system 600, or a portion thereof, constitutes a means for performing one or more steps of generating a pooled route to extend a service area of a shared vehicle.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate a pooled route to extend a service area of a shared vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random-access memory (RAM) or any other dynamic storage device, stores information including processor instructions for generating a pooled route to extend a service area of a shared vehicle. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating a pooled route to extend a service area of a shared vehicle, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating a pooled route to extend a service area of a shared vehicle to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for an application, requested by a message sent from computer 600, through Internet 690, ISP equipment 684, local network 680 and communications interface 670. The received code may be executed by processor 602 as it is received or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
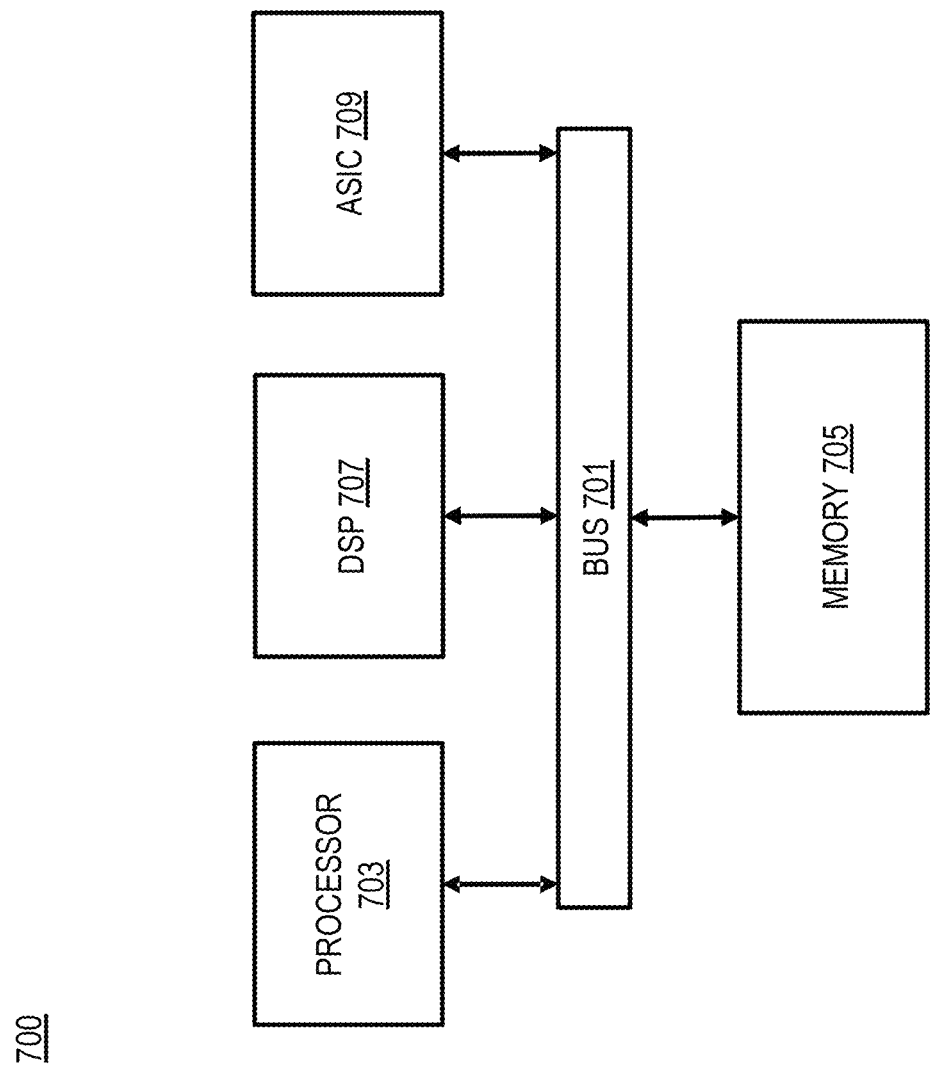
FIG. 7 is a diagram of a chip set that can be used to implement an embodiment of the invention.

FIG. 7 illustrates a chip set or chip 700 upon which an embodiment of the invention may be implemented. Chip set 700 is programmed to generate a pooled route to extend a service area of a shared vehicle as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating a pooled route to extend a service area of a shared vehicle.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general-purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate a pooled route to extend a service area of a shared vehicle. The memory 705 also stores the data associated with or generated by the execution of the inventive steps.

Figure 8:
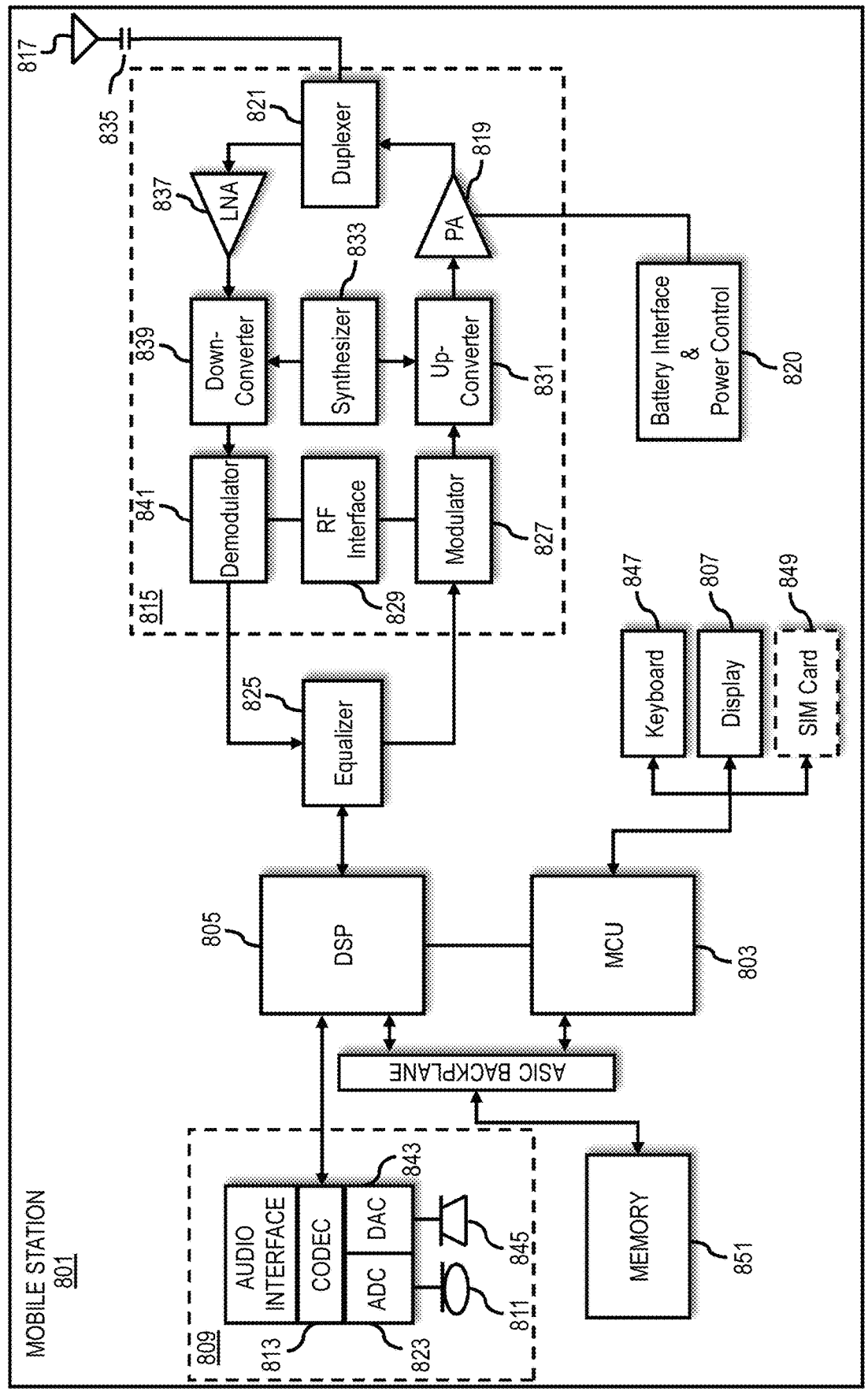
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating a pooled route to extend a service area of a shared vehicle. Generally, a radio receiver is often defined in terms of front-end and back-end characteristics. The front-end of the receiver encompasses all the Radio Frequency (RF) circuitry whereas the back-end encompasses all the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating a pooled route to extend a service area of a shared vehicle. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate a pooled route to extend a service area of a shared vehicle. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating a pooled route to extend a service area of a shared vehicle operated by a shared vehicle service provider, the method comprising: receiving a request from a first user to travel a first route to a destination outside of the service area determined by the shared vehicle service provider of the shared vehicle; determining a second user with a second route that uses the shared vehicle and that is within a threshold proximity, a threshold time, or a combination thereof, of the first route, the destination, or a combination thereof; computing the pooled route for the first user to travel to the destination using the shared vehicle and for the second user to return the shared vehicle to the service area after the first user reaches the destination; and providing the pooled route as an output to a device, wherein the second user is further determined based on a proximity to the first user, and a proximity of a destination of the second route to the destination of the first route.

2. The method of claim 1, wherein the threshold proximity is based on a maximum detour distance between the second route and the pooled route.

3. The method of claim 1, wherein the threshold time is based on a maximum travel time difference between the second route and the pooled route.

4. The method of claim 1, wherein the pooled route originates from the service area.

5. The method of claim 1, wherein the pooled route is computed for the second user to board the shared vehicle in the service area, to pick up the first user with the shared vehicle, to travel to the destination with the first user in the shared vehicle, and to return the shared vehicle to the service area.

6. The method of claim 1, wherein the pooled route is computed for the first user to board the shared vehicle in the service area, to pick up the second user with the shared vehicle, and to travel to the destination with the second user in the shared vehicle; and for the second user to return the shared vehicle to the service area.

7. The method of claim 1, wherein the pooled route is computed for the first user to board the shared vehicle in the service area, to travel to the destination using the shared vehicle, and to hand over the shared vehicle to the second user at the destination; and for the second user to return the shared vehicle to the service area.

8. The method of claim 1, wherein the pooled route is further computed for the second user to reach a destination of the second route using the shared vehicle after the first user reaches the destination of the first route, and wherein the destination of the second route is determined based on a user input by the second user, a mobility pattern of the second user, or a combination thereof.

9. The method of claim 1, further comprising:

providing data for presenting a user interface to the first user, the second user, or a combination thereof to display the pooled route, an option to accept the pooled route, an incentive associated with the pooled route, or a combination thereof.

10. An apparatus for generating a pooled route to extend a service area of a shared vehicle operated by a shared vehicle service provider, the apparatus comprising: at least one processor; and at least one memory including computer program code for one or more programs, the at least one memory and the computer program code configured to, with the at least one processor, cause the apparatus to perform at least the following, receive a request from a first user to travel a first route to a destination outside of the service area determined by the shared vehicle service provider of the shared vehicle; determine a second user that has a second route using the shared vehicle; compute the pooled route for the first user to travel to the destination using the shared vehicle and for the second user to return the shared vehicle to the service area after the first user reaches the destination; and provide the pooled route as an output to a device, wherein the second user is further determined based on a proximity to the first user, and a proximity of a destination of the second route to the destination of the first route.

11. The apparatus of claim 10, wherein the second user is further determined based on the second route being within a threshold proximity, a threshold time, or a combination thereof, of the first route, the destination, or a combination thereof.

12. The apparatus of claim 10, wherein pooled route is computed for the second user to board the shared vehicle in the service area, to pick up the first user with the shared vehicle, to travel to the destination with the first user in the shared vehicle, and to return the shared vehicle to the service area.

13. The apparatus of claim 10, wherein the pooled route is computed for the first user to board the shared vehicle in the service area, to pick up the second user with the shared vehicle, and to travel to the destination with the second user in the shared vehicle; and for the second user to return the shared vehicle to the service area.

14. The apparatus of claim 10, wherein the pooled route is computed for the first user to board the shared vehicle in the service area, to travel to the destination using the shared vehicle, and to hand over the shared vehicle to the second user at the destination; and for the second user to return the shared vehicle to the service area.

15. A non-transitory computer-readable storage medium for generating a pooled route to extend a service area of a shared vehicle operated by a shared vehicle service provider, carrying one or more sequences of one or more instructions which, when executed by one or more processors, cause an apparatus to perform: determining a first user that has a first route to a destination outside of the service area of the shared vehicle; receiving a request from a first user to travel a first route to a destination outside of the service area determined by the shared vehicle service provider; determining a second user that has a second route using the shared vehicle; computing the pooled route for the first user to travel to the destination using the shared vehicle and for the second user to return the shared vehicle to the service area after the first user reaches the destination; and providing the pooled route as an output to a device, wherein the second user is further determined based on a proximity to the first user, and a proximity of a destination of the second route to the destination of the first route.

16. The non-transitory computer-readable storage medium of claim 15, wherein the second user is further determined based on the second route being within a threshold proximity, a threshold time, or a combination thereof, of the first route, the destination, or a combination thereof.

17. The non-transitory computer-readable storage medium of claim 15, wherein the threshold proximity is based on a maximum detour distance between the second route and the pooled route.

\* \* \* \* \*